April 29, 1958 — J. M. SHERMAN — 2,832,535
COMPUTING SCALE
Filed Oct. 25, 1951 — 5 Sheets-Sheet 3

INVENTOR.
JOHN M. SHERMAN
BY Marechal & Biebel
ATTORNEYS

April 29, 1958  J. M. SHERMAN  2,832,535
COMPUTING SCALE

Filed Oct. 25, 1951  5 Sheets—Sheet 4

*INVENTOR.*
JOHN M. SHERMAN
BY Marechal & Biebel
ATTORNEYS

April 29, 1958   J. M. SHERMAN   2,832,535
COMPUTING SCALE
Filed Oct. 25, 1951   5 Sheets-Sheet 5

*INVENTOR.*
JOHN M. SHERMAN
BY
Marechal & Biebel
ATTORNEYS

United States Patent Office 2,832,535
Patented Apr. 29, 1958

2,832,535

COMPUTING SCALE

John M. Sherman, Dayton, Ohio, assignor to The Hobart Manufacturing Company, Troy, Ohio, a corporation of Ohio Application October 25, 1951, Serial No. 253,091

14 Claims. (Cl. 235—61)

This invention relates to computing scales and more particularly to scales which provide an indication of both weight and computed value.

It is a principal object of the invention to provide a computing scale which is rapid and accurate in its operation, which can be readily set for any desired price per pound over a wide range, and which will afford an indication of both the weight and the computed value on the basis of such unit price.

It is a further object to provide an electrical system for the operation of such a scale which has the desired speed of response, accuracy in indication and uniformity of operation so that it meets the commercial requirements for a scale intended for high speed and accurate weighing operations.

It is a further object to provide such a scale in which provision is made for readily calibrating the scale to be certain that it is maintained at all times in a proper position of adjustment, the calibrating operation being performed at any time desired and requiring only a brief interval for so doing.

It is also an object to provide a weighing system in which a current is produced which is proportional to the weight, the current being passed through a resistance network to produce voltages one of which is directly proportional to the weight and the other of which is directly proportional to computed values, the respective voltages then being utilized to operate a pair of potentiometers which provide a balancing voltage in conjunction with indicators which correctly show the proper weight and computed values.

It is a further object to provide a pricing network for such a scale having provision for presetting a desired price per pound and incorporating a divider corresponding to a predetermined integral number of pounds for the set price so that any unit price may be selected over a wide range.

It is a still further object to provide such a pricing network which has taps to select portions of the network corresponding to different unit prices from which a voltage is obtained proportional to the computed value and in which the overall resistance of the network remains constant to enable a voltage to be derived therefrom proportional only to the weight.

It is also an object to provide computing and weight indicating potentiometers of the slide wire type with supplementary resistances providing an extended range, the slide wire control effecting the inclusion or exclusion of different portions of the resistance network in addition to the slide wire part, automatically in the course of the operation, to extend the range as desired.

Other objects and advantages will be apparent from the following description, the accompanying drawings, and the appended claims.

In the drawings —

Figure 1:
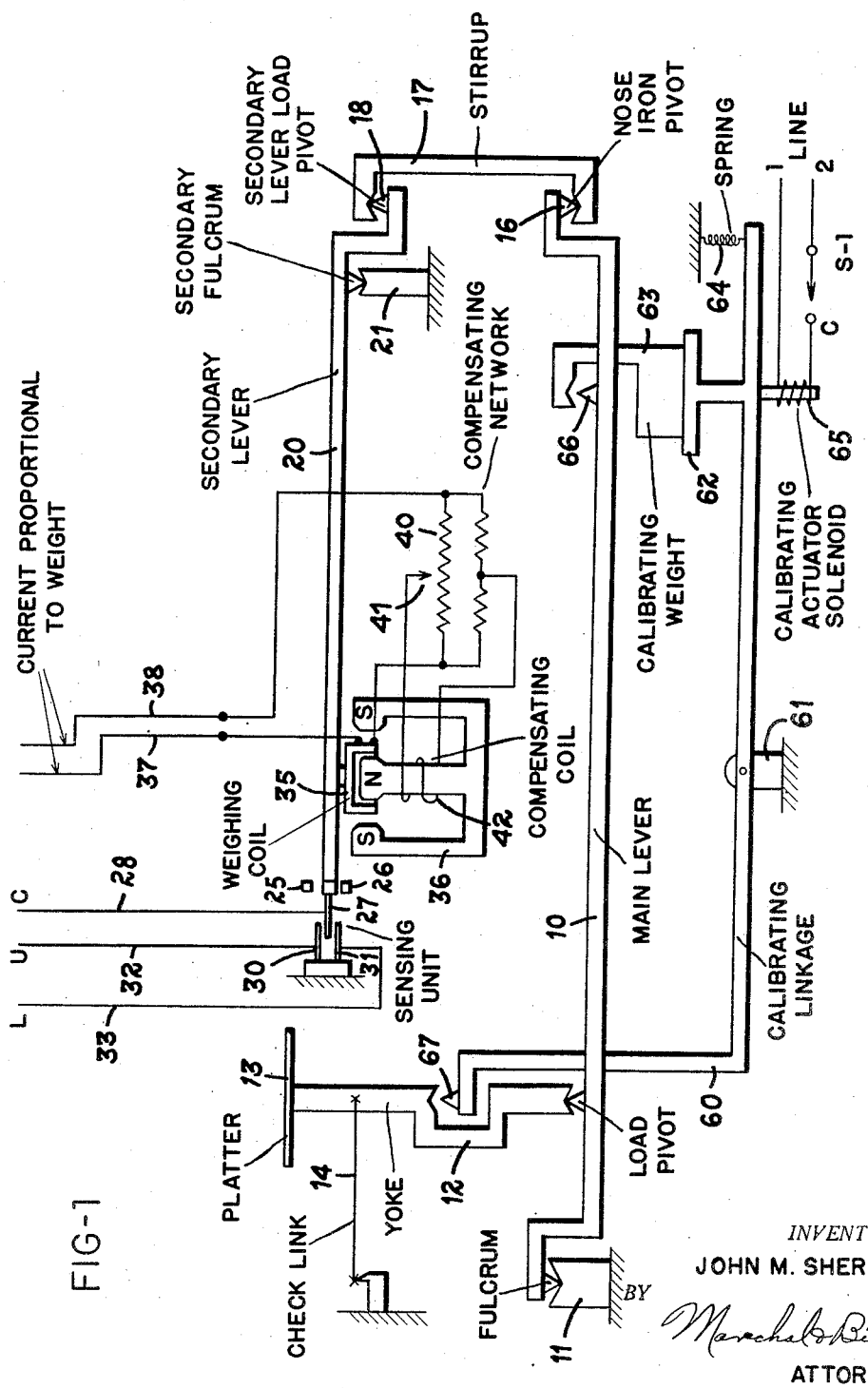
Fig. 1 is a schematic view showing a weighing mechanism suitable for use in the present invention and indicating the weighing coil and its connections.

Referring to the drawings which disclose a preferred embodiment of the invention, a typical weighing mechanism is illustrated in Fig. 1 although it will be understood that other forms of weighing mechanism may be used as desired. The main lever is shown at 10 mounted on fulcrum 11 carrying yoke 12 supporting platter 13 with check link 14. A nose iron pivot 16 is carried by lever 10 and engages stirrup 17 which rides on the load pivot 18 of secondary lever 20, supported on fulcrum 21. This secondary lever moves between fixed stops 25, 26, and carries a sensing plate 27 connected to line 28 and extending between and out of contact with upper and lower plates 30 and 31 connected respectively to lines 32 and 33 forming the plates of a condenser and constituting a sensing unit which will respond to the position of the plate 27 and hence to the travel of secondary lever 20. The upper stop 25 is set to prevent the movable plate of the sensing device from coming in contact with upper plate 30 while the lower stop 26 is set to prevent the movable plate from moving beyond the midpoint between the fixed plates.

It will be seen that application of weight to the platter 13 will tend to raise lever 20 and an electromagnet coil 35 carried thereon, coil 35 being located in the field of a permanent magnet 36. Current flow in coil 35 produces a force which resists movement of the lever in response to the application of a weight to the platter. Current is supplied to coil 35 through lines 37, 38, and a compensating network 40 is included in the circuit with an adjustable contact 41 connected to a compensating coil 42 wound on the central leg of magnet 36. It will be evident that upon variation of the position of contact point 41 the current through the compensating coil 42 will be caused to either aid or oppose the flux produced by the magnet 36. In this way the functional relationship between the current in coil 35 and the force exerted by the magnet on coil 35 may be altered, and it may for example be made to have a linear relationship or such other relationship as may be desired.

Figure 2:
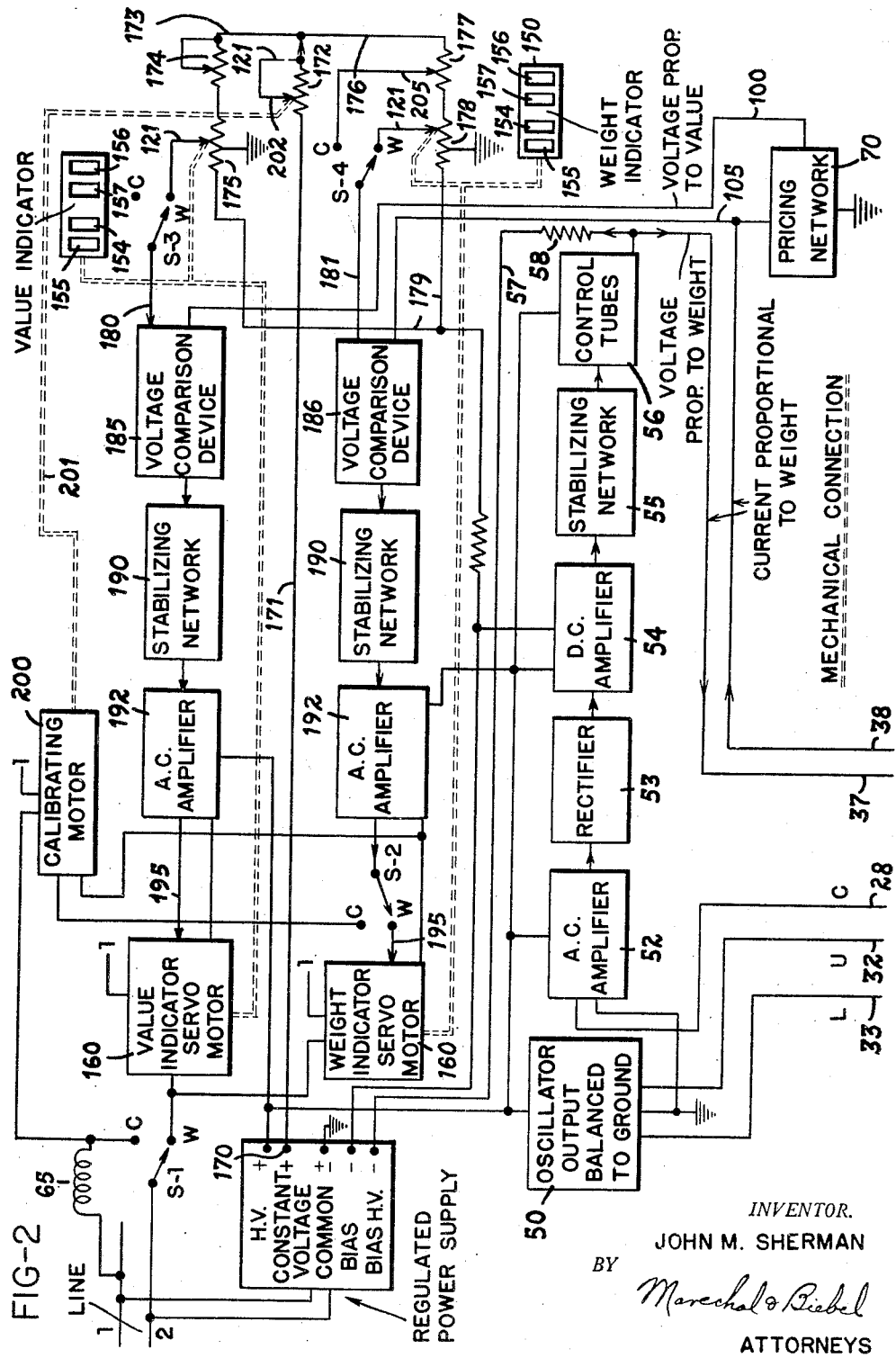
Fig. 2 is a circuit diagram of the control circuits for use in the weighing and calibrating operations, the connections at the bottom of Fig. 2 being indicated in the same relative positions as those at the top of Fig. 1 to show the way in which the two figures may be assembled to form a composite diagram.

The purpose of the mechanism described above is to obtain a current directly proportional to weight. It is not important that the displacement of either the main or secondary levers be directly proportional to weight, the physical displacement of these levers being relatively unimportant as long as the proper control of the current is obtained. This is accomplished by supplying a suitable high frequency current to the two condenser plates 30 and 31 from an oscillator 50 (Fig. 2) through lines 32 and 33. A suitable supply for this purpose is a source of about 30 volts between plates, and 15 volts between each plate and ground, at a frequency of approximately 12,000 cycles per second. The position of the lever is determined by the central plate 27 of the condenser which forms a pickup and supplies control energy through line 28 to an amplifier 52, suitably supplied with power from the regulated power supply. As the lever travels up and down, there is a sharp variation in the pickup voltage introduced in this amplifier, and this in turn is rectified in electronic rectifier 53, amplified in a D. C. amplifier 54, and passed through stabilizing network 55 to control tubes 56. These elements are essentially known and need no detailed description since they perform their usual function as will be understood by those skilled in the art. The output of the control tube is a direct current supplied to line 37. Since the control tubes can control only a unidirectional current, a bias current is supplied from the regulated power supply through line 57 and resistor 58 in order that control can be maintained in the vicinity of zero load current, which zero current corresponds to no load on the platter.

The current flow through line 37 travels through the coil 35 and produces a force of attraction to magnet 36 which is applied to the lever 20 so that a balanced condition is reached at which time the load current through the coil 35 will be directly proportional to the weight. This current will increase and decrease in direct linear relation with the weight applied to the platter, sufficient displacement of the lever occurring to produce enough current to provide the force to counterbalance that particular load. Thus this arrangement provides for obtaining a current directly proportional to the weight although not necessarily directly proportional to the displacement of the lever.

For calibrating purposes a calibrating linkage is associated with the weighing mechanism including a lever 60 pivoted at 61 having a platform 62 on which there is supported a known calibrating weight 63. In the weighing position a spring 64 lifts lever 60 so that the calibrating weight is held out of contact with the main lever and is ineffective. During the calibrating operation however a solenoid 65 is energized which pulls the platform 62 downwardly against the action of spring 64, thereby allowing the calibrating weight to rest on pivot 66, the linkage at the same time acting through pivot 67 to raise the platter and yoke away from the lever. The weight 63 is of such amount and is applied to the lever in such position as to provide a known force, preferably slightly in excess of the full scale deflection of the scale.

In order to utilize the current proportional to the weight, that current is passed through a resistance, and a voltage is thereby obtained. With a constant resistance, that voltage will be proportional to the weight. With the amount of the resistance made variable in proportion to the price per pound, it will be clear that that voltage will then be proportional to the product of the variable current and the variable resistance, and hence will represent computed value.

In accordance with the present invention the current proportional to weight is passed through a network which is of such characteristics that different portions of it may be selected, and the voltage of such portions above ground are measured as indicating computed value, while the overall value of the resistance remains the same and hence the voltage over the entire network will be directly proportional to weight. In other words, the current proportional to weight passing through the pricing network creates two voltages, one proportional to value and the other proportional to weight, and those voltages are then utilized in the further operation of the system to provide proper actuation and corresponding indication of the respective values.

Figure 3:
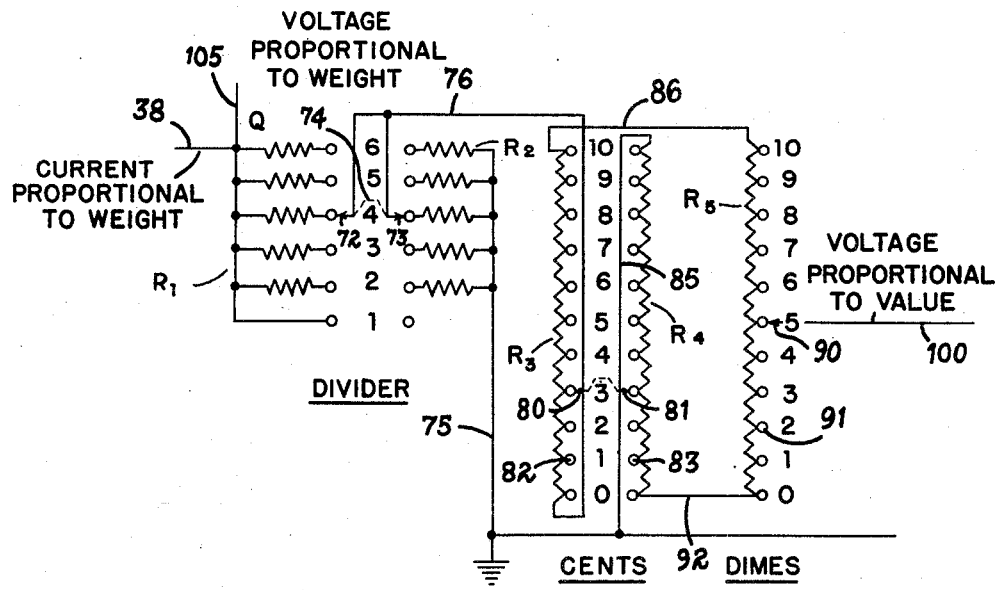
Fig. 3 is a schematic diagram showing the pricing network.
Figure 4:
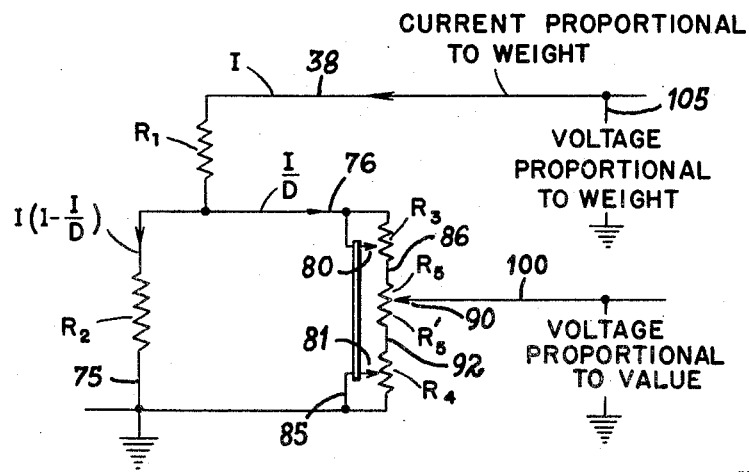
Fig. 4 is a diagrammatic view of the circuit through the pricing network indicating the voltages derived therefrom.

The network 70 is shown in Fig. 3 and for better understanding will be described with reference to a specific embodiment although it will be understood that various changes may be made therein within the scope of the invention. As shown, the current proportional to the weight flows through line 38. It first passes through a selected one of a series of resistors indicated as $R_1$. There is a corresponding series of resistors $R_2$ and a pair of adjustable contact devices 72, 73 movable in a vertical direction in the diagram are connected to each other as shown at 74 and are adapted to simultaneously connect corresponding resistors of each of the two series in each of the several positions thereof. The opposite ends of the $R_2$ series of resistors are connected to a common ground point by line 75 and hence $R_1$ and $R_2$ form a divider, providing for diverting a part of the current in line 38 directly to ground.

The remaining portion of the current flows from contacts 72, 73 through line 76 to the bottom of another series of resistors $R_3$. A series of resistors $R_4$ is arranged opposite the $R_3$ series and a pair of sliding contacts 80, 81 are moved together over the respective series of resistor contacts 82, 83. Contact 80 is connected to line 76 and contact 81 is connected to line 85 which runs from the top of the $R_4$ series to a ground point. A connection 86 extends from the top of the $R_3$ series of resistors to another series indicated as $R_5$, this series having an adjustable contact point 90 which travels over the contacts 91 of the $R_5$ series connecting respectively therewith in accordance with its setting. The bottom of the $R_5$ series is connected to the bottom of the $R_4$ series by means of line 92.

As examples of typical values, each of the ten resistors in the $R_3$ and $R_4$ series may conveniently be of 100 ohms value, and thus correspond to a unit price of cents per pound while each of the ten resistors of the $R_5$ series may be of 1,000 ohms and thus correspond to dimes per pound. With the particular values shown the price may be set at any value from 1 cent to $1.10 per pound but this range may obviously be extended or changed as desired.

Analysis of the circuit will show that movement of the resistor contacts 80, 81 and of contact 90 will vary the amount of voltage of line 100 which is measured above ground potential but that neither such adjustment will alter the effective resistance in the path of flow of current in line 76 to ground. As each unit of resistance is shorted out of $R_3$, a corresponding amount of resistance is included in the overall circuit through resistor $R_4$. Similarly adjustment of voltage tap 90 does not alter the resistance of $R_5$ as a whole. It follows therefore that the setting of the contacts 80, 81 and tap 90, as may be predetermined to establish a desired price per pound, and the voltage of line 100 above ground which is connected to contact 90 will vary directly with the setting of the dime series of resistors $R_5$ and with the cents series of resistors $R_3$ and $R_4$, as well as with the current flow which has been made proportional to weight, and hence this voltage at contact 90 is a measure of computed value.

Resistances $R_1$ and $R_2$ form a divider the purpose of which is to divide the voltage at contact 90 by some small integral number corresponding to that number of pounds for a certain price. Their function in the circuit will be more readily understood by reference to this diagram and in conformity with the foregoing description. Since contacts 80 and 81 move together, the sum of the portions of $R_3$, $R_4$ and $R_5$ included in the circuit remains a constant. For purpose of analysis the portion of the $R_5$ resistor below contact 90 is identified as $R'_5$. Accordingly $E_v$, the voltage proportional to the computed value existing between line 100 and ground may be expressed as follows:

$$V_v = KI(R_4 + R'_5)$$
$$= KIR_4 + KIR'_5$$

In this equation I is the current proportional to weight and K is the divider and by considering it as the reciprocal of the dividing factor D (D being the small integral number mentioned above), i. e., $$K = \frac{1}{D}$$

the above equations may be rewritten as follows:

$$E_v = \frac{I}{D}(R_4 + R'_5)$$

which may be rewritten as $$E_v = I\left(\frac{R_4 + R'_5}{D}\right)$$

As described above $R_3 + R_4 + R_5 = $ a constant which may be called $R_K$; therefore $$R_2 I\left(1 - \frac{1}{D}\right) = R_K \frac{I}{D}$$

From which $$R_2 = \frac{R_K}{D-1}$$

Accordingly this formula gives the relationship by means of which suitable values of the divider series of resistances may be determined. For example, if $D=1$ then $R_2$ is infinite—note the open circuit in the No. 1 position of the divider. If $D=2$ then $R_2 = R_K$ which for purposes of convenience is established in the present circuit as 1100 ohms. If $D=3$, $$R_2 = \frac{R_K}{2} \text{ or } 550 \text{ ohms}$$

By following out the same pattern the entire series of the $R_2$ resistors may be determined.

In order to determine the values of the $R_1$ series, it is necessary that these individual resistors be so selected that in circuit with the remainder of the network, they will provide for maintaining the overall network resistance constant. That is, the resistance of $R_2$ in parallel with $R_K$ is $$\frac{R_2 R_K}{R_2 + R_K}$$

Therefore the total resistance of the network equals $$R_1 + \frac{R_2 R_K}{R_2 + R_K}$$

which by definition must equal another constant $R_C$. It is convenient (though not necessary) to have $R_C$ equal $R_K$, and when this is the case $$R_1 = R_K - \frac{R_2 R_K}{R_2 + R_K}$$

By substituting the value of R as shown above, and simplifying it will be evident that $$R_1 = R_K \left(\frac{D-1}{D}\right)$$

Substitution of integral values for the dividing factor in this equation will show the following table of relationships:

When $D=1$ then $R_1 = 0$
When $D=2$ then $R_1 = \frac{1}{2} R_K$
When $D=3$ then $R_1 = \frac{2}{3} R_K$
When $D=4$ then $R_1 = \frac{3}{4} R_K$, and so on.

It will be noted that in the No. 1 position of the divider there is no resistance in the $R_1$ resistor in the No. 2 position the $R_1$ resistor has a value of 550 ohms with the other constants as assumed, and by similar analysis the remaining values can be worked out for whatever range of dividing factors is desired.

As a typical example, with the adjustments of the pricing network set as shown in Fig. 3, it is adjusted to a value of four pounds for 53¢.

Since the overall resistance of the network does not change, regardless of the settings of the divider resistors $R_1$ and $R_2$ or the cents and dimes resistors $R_3$, $R_4$ and $R_5$, it follows that the voltage of the entire network with respect to ground will vary with the current and hence directly with the weight. Line 105 is connected to the network and its voltage is used as a direct measure of weight. The voltage in line 100 however does vary both in relation to the current and to the selected values of resistance so that its value does correspond directly to the product of weight and unit price, or computed values.

Figure 5:
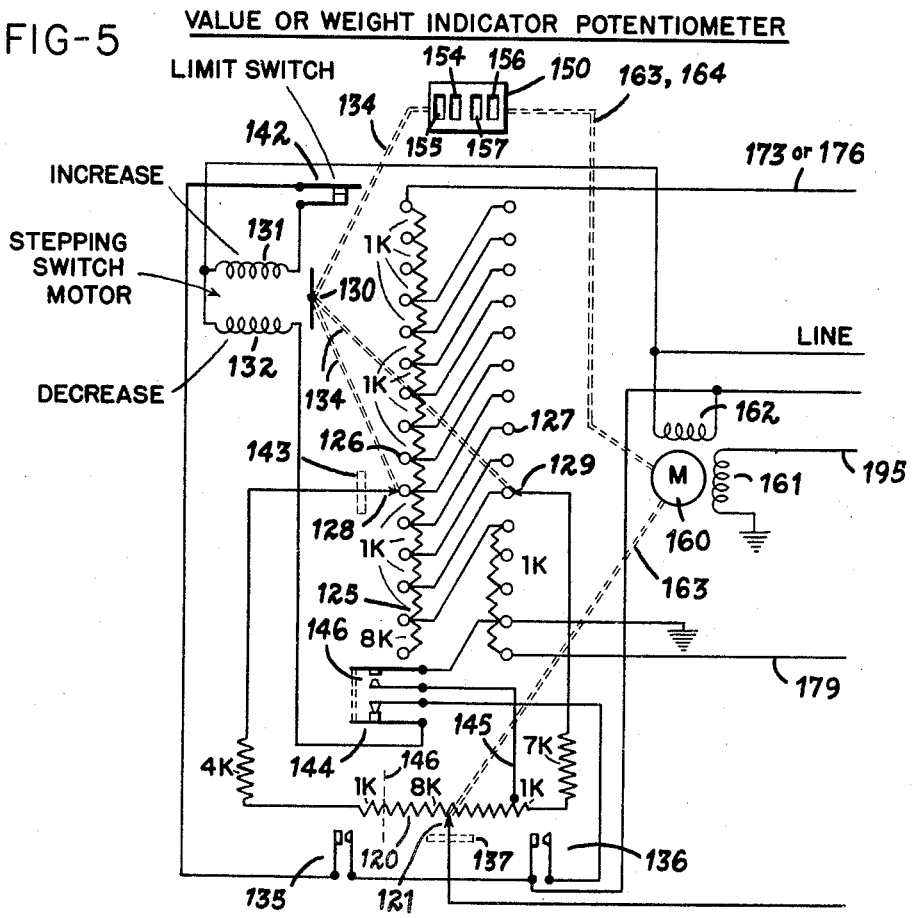
Fig. 5 is a schematic view of the indicating potentiometer used for indicating the value and weight.
Figure 6:
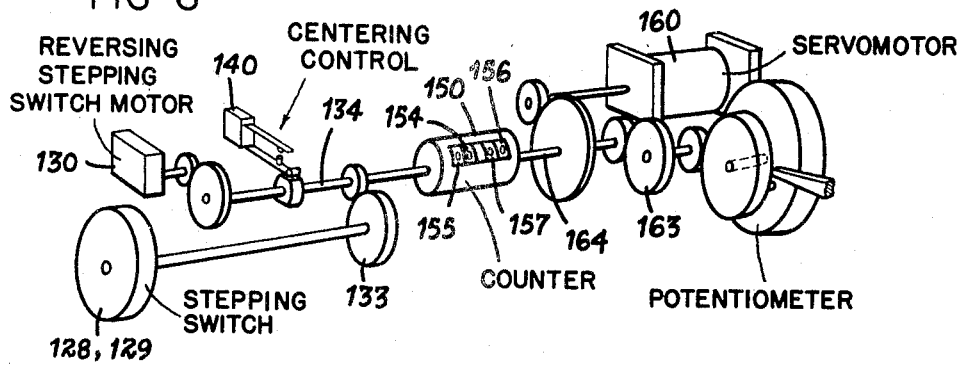
Fig. 6 is a schematic view in perspective showing the controls employed in conjunction with the potentiometer and the counter providing the indication for value or weight.
Figure 7:
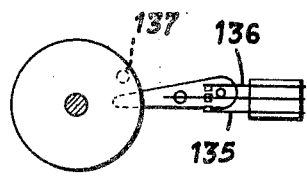
Fig. 7 is a detailed view of a portion of the control mechanism shown in Fig. 6.

The means by which the voltages so produced are utilized to produce indications corresponding to weight and total price will now be described, it being understood that the systems are the same for the weight and value indicators and essentially duplicated throughout. In order to provide such indication, a potentiometer is utilized, the circuit, principle, and operating features of which are shown in Figs. 5 through 7. The potentiometer itself embodies a slide wire portion 120 with a movable contact 121 which is adjustable thereover. The accuracy of linearity of the slide wire portion of the device is relatively limited, and in order to provide a greater overall accuracy, a series of resistors 125 is arranged with a double series of contacts 126 and 127, the latter being connected in offset relationship so that when the two contact points 128 and 129 occupy any pair of opposite positions, as shown, they add or remove resistance from one end of the slide wire and hence operate to extend the effective range thereof. By means of the circuit used, the resistance from the upper end of potentiometers 172 and 178 to ground is maintained constant regardless of the position of stepping switches, thus causing no change in the potentiometer reference currents. The contacts 128 and 129 may be actuated by a reversing stepping switch motor 130, selectively energized by a coil 131 in the direction to cause increased resistance in the circuit and by a coil 132 in the direction to cause decreased resistance. The stepping switches are operated by reduction gearing 133 from shaft 134 driven by the motor 130. The circuits for these coils are controlled respectively through limit switches 135 and 136 actuated by a pin 137 movable with the sliding contact 121. Tracing of the circuits will show that when the sliding contact moves to the left the circuit will be completed to the increase solenoid 131 to increase the amount of resistance to the left of the potentiometer contact, and conversely for the opposite travel of the contact. A centering control 140 is provided as well-known to assure the travel of movable contacts 128 and 129 in full steps, corresponding to a half revolution of shaft 134, thereby assuring that the indicating counter will always stop in a full indicating position inasmuch as one-half a revolution of shaft 134 produces one-tenth of a revolution of units wheel 154 through differential 165. An upper limit switch 142 opens the circuit at the extreme upper limit of travel, being actuated by pin 143 carried by the movable contact assembly 128, 129 with a corresponding limit switch 144 being similarly actuated in the extreme lowermost position.

Fig. 5 shows typical values for the main series of resistors constituting the potentiometer, those connected to the double series of contacts 125, 127 each being 1000 ohms except the bottom resistor in the left-hand series which is indicated as 8000 ohms. The slide wire portion of the potentiometer has a resistance of 8000 ohms with an extension of 1000 ohms at each end, that at the right-hand having a tap 145 leading to normally open switch 146 which is closed by pin 143 at the same time limit switch 144 opens, i. e., in the lowermost position of adjustable contacts 128, 129. The resistors in series with the slide wire portion are of 4000 and 7000 ohms respectively.

It will be seen that the slide wire portion thus in effect constitutes a bridging circuit for three sections of the main series of resistors. In all except the lowermost position, it thus bridges three resistances in series totaling 3000 ohms, and its own resistance is made up of 4000 ohms plus 1000 plus 8000 plus 1000 plus 7000, totaling 21,000. This provides for a predetermined current division with the main group of resistors.

In order to enable the device to measure down through zero position, a different circuit is provided when the contacts 128 and 129 occupy the lowermost position on the main series of resistors. In this case the actuating pin 143 closes contact 146, connecting the tap 145 on the slide wire to ground. At the same time the 8000 ohm lowermost resistor in the main series is included in the bridging circuit of the slide wire. By tracing the circuits it will be found that under these circumstances the same relative resistances are obtained as in each of the other positions, resulting in a corresponding distribution or division of the current in the main and in the bridging circuits. In this way the total resistance to the current flowing through line 173 or 176 to ground is not changed, whatever the setting of the potentiometer, while a full range of adjustment, coupled with a high degree of accuracy, is obtained throughout the entire range and through the zero point of the potentiometer.

Figure 8:
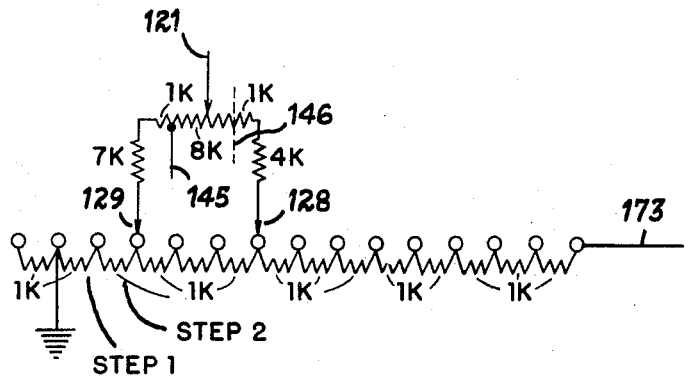
Figs. 8, 9 and 10 are simplified diagrammatic views of the potentiometer circuits in three different positions of adjustment.
Figure 9:
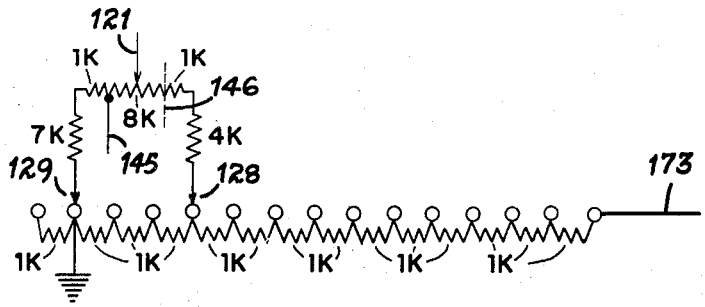
Figure 10:
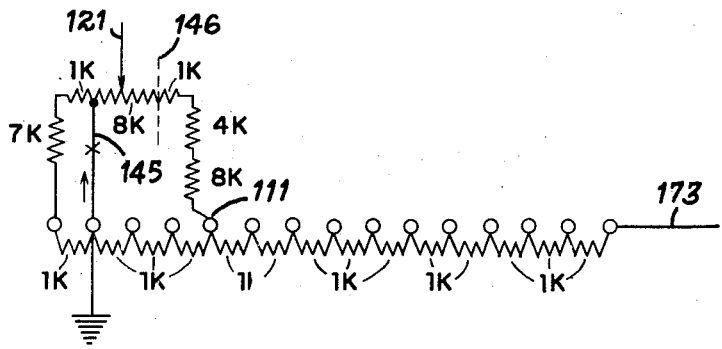
Figure 11:
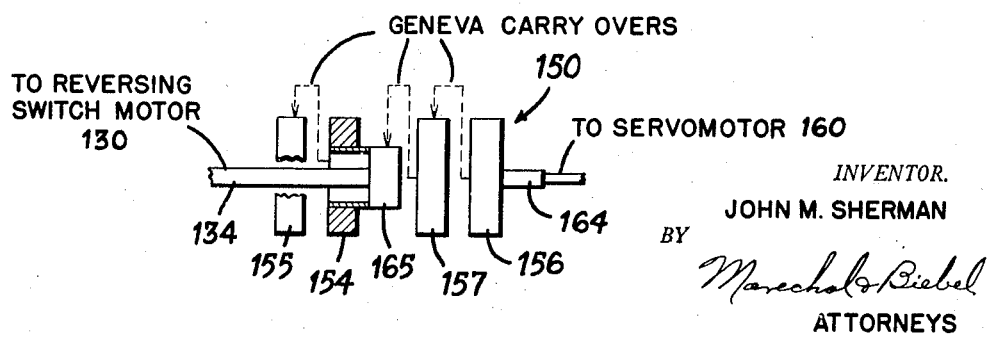
Fig. 11 is a schematic view of the relationship of the several dials on the counter.

Several typical circuit diagrams are shown in simplified form in Figs. 8, 9 and 10. Fig. 8 represents the condition where the bridging circuit is located in an intermediate position on the main series of resistors. As a typical example, each step above the ground but below the slide wire bridge circuit contact 129 may be representative of a full dollar of value. In addition, the circuit between contact 129 and the tap 145 is representative of another even dollar. The fractional part of the dollar beyond this value is determined by the actual position of the adjustable tap 121 on the central or 8000 ohm portion of the slide wire resistor. Accordingly position 8 would represent an indicated value of approximately $3.60.

In the circuit diagram Fig. 9, the lower arm 129 of the bridging circuit is connected to ground and hence there are no stepped resistors above ground and below the bridging circuit. However between the grounded contact 129 and the tap 145 on the slide wire the 7000 and 1000 ohm resistances are in the circuit, corresponding to an even dollar of value and hence Fig. 9 corresponds to a value of about $1.60, the bridging circuit having been moved down two full steps on the main series of resistors.

Fig. 10 represents the condition where the contact arms 128 and 129 of the bridging circuit occupy the lowermost position. As described above the tap 145 is now connected to ground and the 8000 ohm resistor is included in series with the slide wire in the bridging circuit. Since there are no resistors between the ground contact and tap 145, the total value is represented by the position of the adjustable tap 121. When adjustable contact 121 coincides with tap 145 it is at ground potential or zero value and as it travels above this point it represents a fractional part of a dollar. When it reaches the reference point 146, that point corresponds to an even dollar, and as will be evident from the diagram it is provided with some range of travel beyond that reference, roughly about 7 percent overtravel. When this predetermined amount of travel is exceeded, contact pin 137 closes switch 135 and provides for the stepping upward of the main contacts 128, 129 of the potentiometer as described above, each upward step of the main contacts being representative of an increment of a predetermined unit such as a dollar of value or a suitable unit as a pound of weight, as the case may be.

The position of the movable parts of the potentiometer is directly related to the counter, indicated generally at 150. The shaft 134 operated by the stepping switch motor 130, and hence corresponding directly to the position of the stepping switches 128 and 129, operates the left-hand pair of indicator dials or wheels of the counter as shown in Fig. 6. These dials 154 and 155 are operated through suitable gear reductions from shaft 134 and provide indications of the units and decades respectively, or similar 3rd and 4th place indications in whatever system may be desired. As described above, the centering control 140 assures that the motion of the shaft will always leave the dials in full reading position.

The driving of the slide wire contact 121 and the operation of the remaining dials 156 and 157 of the counter, which correspond to hundredths and tenths or first and second place indications, is effected by means of a servomotor 160 which is shown as a two-phase motor having a first phase winding 161 with a second phase winding 162 in quadrature relationship thereto. One such winding 162 may be continuously energized and the other winding 161 is selectively energized in one phase relation or the other to provide for selective reversing operation of the motor. It drives the slide wire portion of the potentiometer through suitable reduction gearing indicated at 163 and through shaft 164 drives the two counter wheels 156, 157. Carry-over from second wheel 157 to the third wheel 154 is provided in the counter by a mechanical differential 165, so that no ambiguity of indication can result at the carry-over points. That is, when wheel 157 advances from its 9 to zero position, it drives through differential 165 to advance wheel 154 by one tenth of a revolution. Wheel 154 may also be advanced directly through rotation of its drive shaft 134, without affecting wheels 156 or 157.

It will thus be seen that the position of adjustable contact 121 on the slide wire is directly related to wheels 156 and 157, corresponding on the value potentiometer to cents and dimes, respectively, while the position of contacts 128, 129 on the main series of resistors is directly related to wheels 154 and 155, corresponding to dollars and tens of dollars respectively. In addition when slide wire contact 121 passes reference point 146 it acts through differential 165 to step wheel 154 and thus add a dollar of value to whatever is showing on that wheel at the time, the wheels 156 and 157 meanwhile passing from the 99 to the 00 position. A converse action occurs when contact 121 returns to the main 8000 ohm central section of the slide wire. In the same manner as contact 121 passes below tap 145 it subtracts one dollar from the indication on wheel 154, and conversely.

It will thus be apparent that the indicator 150 will at all times provide an indication which is directly related to the setting of the potentiometer. By passing a constant current through the potentiometer, a voltage will be produced at the sliding contact point 121 which is directly related to the position of the slide wire and of the stepping switches 128, 129. Means are provided therefor for producing such a constant current, passing it through the potentiometer, and comparing the potentiometer voltage with that resulting from the weighing or pricing network. For this purpose the regulated power supply has a connection 170 adapted to supply a constant voltage from which current flows through line 171 and an adjustable rheostat 172, such rheostat being set in the calibrating operation as described hereinafter. The current then divides, one part flowing through line 173 and adjustable rheostat 174 to the value indicating potentiometer shown at 175, with the other part passing through line 176, resistance 177 to the weight indicating potentiometer 178. A ground connection is established for each potentiometer at some definite value above the end thereof, and the end is connected to the return line 179. The adjustable contacts 121 on the potentiometers are connected respectively through arms S-3 and S-4 of a 4-pole double throw switch indicated in Fig. 2. For the weighing operation all four of the switch arms are connected to W, the C position being used for calibrating only.

Connection is made through lines 180 and 181 into voltage comparison devices 185 for the value and 186 for the weight. It will be seen that line 105, the voltage line from the network carrying the voltage proportional to the weight, also is connected into the comparison device 186 while voltage line 100 from the network and carrying the voltage proportional to value leads into the comparison device 185. These voltage comparison devices are generally well-known and operate to alternately connect one line (180 or 181) and then the other line (100 or 105) into the circuit for the respective devices 185 and 186. They are actuated by a synchronous drive device from the same power line as that supplying the servomotors 160. If therefore the voltage at the particular setting of potentiometer 178 is different from the voltage in line 105, the alternate connection of lines 181 and 105 into the comparison device 186 will in effect result in an alternating current wave, even though both voltages themselves are direct current. Also it will be evident that such alternating current as so produced will have distinctive characteristics, i. e., as to its phase relationship, as determined by its synchronous drive motor, and depending upon which of the two voltages is greater. The alternating current wave is then supplied to stabilizing network 190, amplifier 192, and in the case of the weight indicating device through another arm S-2 of the calibrating switch directly into the servomotor 160 through line 195. A similar connection is made in the case of the value indicating motor except that it does not require the interposition of the calibrating switch.

The operation of the potentiometer in an actual weighing operation can now be described. The voltage in line 105 is proportional directly to the weight on the platter, just as the voltage in line 100 is proportional to the computed value as fully described above. Referring to the weight indicator, the voltage of line 105 is compared with the voltage of potentiometer 178. Assuming that the potentiometer voltage is less than the voltage in line 105, there will then be a resultant A. C. voltage in comparison device 186 which will be stabilized, then amplified, then transmitted to the weight indicator motor 160. This motor is supplied with alternating current from the same source as that used to drive device 186, and hence the resultant voltage will have a phase relationship which will distinguish it, and which will provide for the operation of the motor 160 in the direction to increase the potentiometer voltage. In so doing the slide wire contact 121 is moved, and correspondingly there is a movement of the first two dials of the counter. As such movement occurs, the voltage of the movable slide wire contact 121 increases, and thus comes closer to equality with the voltage in line 105. If equality is achieved within the range of travel of the slide wire, it will be obvious that there is no longer any resultant to be transmitted through the comparison device, and hence the weight indicator motor will stop. The point at which it stops is therefore that at which the potentiometer voltage is equal to the voltage in line 105, and thus the counter at that stop or equality position provides a reading which is directly proportional to such voltage and hence a measure of the weight in the platter.

If this condition of equality is not achieved within the range of the travel of the slide wire, then the limit switch 135 will be closed to cause the stepping switches 128, 129 to increase the resistance to ground, thereby raising the voltage of the potentiometer in larger increments. This stepping operation therefore continues and when the voltage of the potentiometer contact 121 exceeds that in line 105, the phase of the A. C. wave supplied through comparison device 186 will be reversed, thereby resulting in the opposite rotation of servomotor 160, causing the slide wire contact 121 to travel in the opposite direction to achieve the precise balanced condition. As soon as motor 160 is reversed, contacts 135 open stopping further action of the stepping-switch. It is found in practice that this operation takes place quite rapidly, and without hunting, resulting in the accurate setting of the units and decades counters as well as the tenths and hundredths counters in a short interval of time.

Without further detail analysis it will be evident that an exactly similar operation occurs with potentiometer 175 in comparing its voltage and the voltage in line 100 corresponding to the computed value, causing the value indicator motor to reset its potentiometer and corresponding indicator in a similar manner. In the case of the value indicator the dials 156 and 157 conveniently read in cents and dimes while dials 154 and 155 read in dollars and tens of dollars. For the weight indicator, the first two dials may read hundredths and tenths of pounds with the other two reading pounds and tens of pounds, or such other units as found suitable.

It thus follows that indicators have been provided and will be actuated to respond rapidly and accurately to the actual weight and the value in accordance with the weight in the platter and the setting of the pricing network.

It is found that time and temperature changes may affect the strength of the permanent magnet field, as well as the constancy of voltage 170, and it is therefore desirable to provide for periodically checking the setting of the device in order to calibrate it. For this purpose the 4-pole double throw switch system indicated in the diagram has been provided, and when it is desired to check the scale, this switch is thrown from the W or weighing position to the C or calibrating position. When this is done, solenoid 65 is energized through switch arm S-1, calibrating lever 60 is drawn downwardly against the action of the spring 64 and the known calibrating weight 63 is suspended on the main lever 10, and platter and the yoke simultaneously being removed therefrom. This results in applying a predetermined and known force or weight to the weighing mechanism, which is preferably slightly in excess of the normal full scale deflection thereof.

Switch arm S-1 also deenergizes both the value indicating servomotor and weight indicating servomotor, providing for the energization of a third servomotor 200 used only for calibrating purposes. Motor 200 is connected mechanically by means 201 to the sliding contact 202 of rheostat 172.

Switch arm S-3 disconnects potentiometer 175 and switch arm S-4 similarly disconnects potentiometer 178 while completing the circuit through an adjustable contact 205 of potentiometer 177. Such connection has the effect of establishing a fixed point of potentiometer 178, somewhat beyond the normal range thereof, which should correspond to the value of the calibrating weight. As will be evident from the circuit diagram of Fig. 2, switch S-4 in the C position includes somewhat more resistance to ground than the potentiometer 178, thereby corresponding to a greater value of weighing current than that normally encountered in any weighing operation. The actual voltage in line 105 produced by the weighing mechanism is then supplied to comparison device 186 together with the voltage determined by the selected position of potentiometer 177. If there is no resultant, then no power is supplied to the calibrating motor 200. If however these voltages are not the same, then a resultant will be developed in the comparison device 186, stabilized, amplified, and transmitted through switch S-2 to the calibrating motor 200 with resultant selective actuation thereof in the same manner described above, to cause the movement of its adjustable contact 202 on the rheostat 172. This adjustment obviously changes the resistance included in the constant voltage circuit, and hence will change the voltage of contact point 205 with respect to ground. Accordingly an adjusting travel of contact point 202 occurs under the action of calibrating motor 200 until such time as the two voltages in device 186 are the same, in which case there is no resultant, and the calibrating motor remains stationary. The rheostat 172 has now been set to fix the reference current in potentiometers 172 and 178 to correspond with the known weight, and it will be evident that when the system is returned to the weighing operation by actuation of all of its switch arms to the W position, the weight and value indicators will then operate to give correct readings in the manner already described above.

Compensation or correction of the value indicator may be effected by adjustment of rheostat 174 as found necessary, to properly relate indications of value indicator to weight indicator. Once this adjustment has been made, the calibrating operation corrects both value and weight reference currents simultaneously.

The invention therefore provides a computing scale which rapidly and accurately performs a weighing operation and which indicates both the weight and the value with the mechanism, having enough power to carry out any desired function such as the operation of an indicator as shown, either alone, or accompanied by the actuation of a printing device to print a ticket, if that should be desired, and references herein to "indicators" or "indicating" are intended to include such printers and the printing of the information on tickets. The system makes use of a current proportional to weight and not directly related to lever displacement. The system is primarily electrical, it has a wide range and adequate flexibility of adjustment, making it possible to select any desired price range, as well as to divide that unit price in any integral submultiple, corresponding to 1, 2 or more pounds for any desired unit price. The potentiometers and their associated counters afford an accurate and rapid means of developing and indicating the values, and by suitable choice of constants may have adequate range for whatever operations may be desired.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a computing scale, a weighing mechanism, means for producing a current proportional to the weight, a resistance, means for varying said resistance in proportion to the selected unit price per pound, means for passing said current through said resistance to produce a voltage directly proportional to the computed value of the weight at the selected unit price, a potentiometer having an adjustable setting, an adjustable indicator, drive means for actuating said indicator in correlated relation with the adjustable setting of said potentiometer, means for passing a constant current through said potentiometer to produce a voltage corresponding to the setting thereof, means for comparing said potentiometer voltage with said voltage proportional to the computed value, and means selectively operable in accordance with the resultant of said voltages for effecting the operation of said drive means in the proper direction to move said potentiometer setting to a balanced position with corresponding operation of said indicator to indicate the computed value.

2. In a computing scale, a weighing mechanism, means for producing a current proportional to the weight, a resistance of constant overall value, means for passing said current through said resistance to produce a voltage proportional only to weight, means for selecting a portion of said resistance proportional to the selected unit price per pound, means for passing said current through said selected portion of said resistance to produce a voltage proportional to the computed value of the weight at the selected unit price, a pair of potentiometers each having an adjustable setting, a pair of adjustable indicators, separate drive means for actuating said respective indicators in correlated relation with the adjustable setting of each of the associated potentiometers, means for passing a constant current through each said potentiometer to produce voltages corresponding respectively to the settings thereof, separate means for comparing said potentiometer voltages respectively with said voltage proportional to weight and with said voltage proportional to computed value to obtain resultants of each such comparison, and means for applying said resultant voltages to said respective drive means in the proper directions to move said potentiometer settings to balance positions with corresponding actuation of said potentiometers to indicate weight and computed values respectively.

3. In a computing scale as defined in claim 1, means for calibrating the device including means for applying a known calibrating weight to the weighing mechanism, an additional driving means, an adjustable rheostat driven by said additional drive means for adjusting the current through said potentiometer, means for temporarily disconnecting said resultant voltage from said driving means and applying the same to said additional driving means to effect adjustment of said rheostat to a balance position.

4. In a computing scale having weighing mechanism and means for producing a current proportional to weight, the combination of a pricing network comprising a series of resistances of predetermined value corresponding to dimes, two additional series of resistances each of $\frac{1}{10}$ the value of said dimes series corresponding to cents, means for connecting all said resistances in series with each other with said dimes series interposed between said cents series, means for adjustably connecting said cents series in the circuit so that increase of one of said cents series is accompanied by concurrent decrease of the other cents series in the same amount, and means operable independently of the connecting means to said cents series for connecting a selected part of said dimes series in the circuit with resulting production of a voltage across said network corresponding to the computed value of the weight at the selected unit price.

5. In a computing scale having weighing mechanism and means for producing a current proportional to weight, the combination of a pricing network comprising a series of resistances of predetermined value corresponding to dimes, two additional series of resistances each of $\frac{1}{10}$ the value of said dimes series corresponding to cents, means for connecting all said resistances in series with each other with said dimes series interposed between said cents series, means for adjustably connecting said cents series in the circuit so that increase of one of said cents series is accompanied by concurrent decrease of the other cents series in the same amount, and an adjustable voltage connection to said dimes series for measuring the voltage produced by said current across selected portions of said dimes series and one of said cents series providing a voltage proportional to the product of said current and resistance representative of computed value.

6. In a computing scale having weighing mechanism and means for producing a current proportional to weight, the combination of a pricing network comprising a series of resistances of predetermined value corresponding to dimes, two additional series of resistances each of $\frac{1}{10}$ the value of said dimes series corresponding to cents, means for connecting all said resistances in series with each other with said dimes series interposed between said cents series, means for adjustably connecting said cents series in the circuit so that increase of one of said cents series is accompanied by concurrent decrease of the other cents series in the same amount, an adjustable voltage connection to said dimes series for measuring the voltage produced by said current across selected portions of said dimes series and one of said cents series providing a voltage proportional to the product of current and resistance representative of computed value, and means for measuring the voltage of the entire network as indicative of weight.

7. In a computing scale having weighing mechanism and means for producing a current proportional to weight, the combination of a pricing network comprising a series of resistances of predetermined value corresponding to dimes, two additional series of resistances each of $\frac{1}{10}$ the value of said dimes series corresponding to cents, means for connecting all said resistances in series with each other with said dimes series interposed between said cents series, means for adjustably connecting said cents series in the circuit so that increase of one of said cents series is accompanied by concurrent decrease of the other cents series in the same amount, means operable independently of the connecting means to said cents series for connecting a selected part of said dimes series in the circuit with resulting production of a voltage across said network corresponding to the computed value of the weight at the selected unit price and a divider incorporating two series of resistances for dividing the current flow through said network to obtain a voltage therefrom as a predetermined integral sub-multiple thereof.

8. In a computing scale having weighing mechanism and means for producing a current proportional to weight, the combination of a pricing network comprising a series of resistances of predetermined value corresponding to dimes, two additional series of resistances each of ⅟₁₀ the value of said dimes series corresponding to cents, means for connecting all said resistances in series with each other with said dimes series interposed between said cents series, means for adjustably connecting said cents series in the circuit so that increase of one of said cents series is accompanied by concurrent decrease of the other cents series in the same amount, a divider incorporating two series of resistances for dividing the current flow through said network to obtain a voltage therefrom as a predetermined integral sub-multiple thereof proportional to the product of weight and price, and means actuated by said divider for maintaining constant overall resistance in said network to obtain a voltage therefrom proportional only to weight.

9. In a computing scale having weighing mechanism and means for producing a voltage proportional to weight, the combination of a potentiometer comprising a series of stepped resistances, a slide wire, means for connecting said slide wire across a predetermined selected group of said resistances and for varying the group so connected, a variable tap on said slide wire, means for passing a constant current through said potentiometer, a drive motor for selectively moving said tap to vary the voltage of said potentiometer, means for comparing said potentiometer voltage with said voltage proportional to weight to obtain a resultant, means for applying said resultant voltage to actuate said motor selectively in accordance with said resultant to move said variable tap in the direction to reduce said resultant voltage, means actuated by the travel of the said tap to the end of said slide wire for selectively changing the stepped resistances to bring the resistance of the potentiometer into a range where said resultant voltage will be zero within the range of said slide wire.

10. In a computing scale having a weighing mechanism and means for producing a current flow proportional to weight, the combination of means for producing a substantially constant current flow, a potentiometer for receiving said constant current flow and developing a corresponding voltage, said potentiometer including a main series of resistances, a bridging circuit including a slide wire resistance having an adjustable contact, means for connecting said bridging circuit across a predetermined number of said main resistances, means for stepping said bridging circuit to different positions on said main series of resistances, independent control means for actuatng said adjustable slide wire contact, and means controlled by said slide wire contact as it approaches either limit of its travel for actuating said stepping means.

11. In a computing scale having a weighing mechanism and means for producing a current flow proportional to weight, the combination of means for producing a substantially constant current flow, a potentiometer for receiving said constant current flow and developing a corresponding voltage, said potentiometer including a main series of resistances, a bridging circuit including a slide wire resistance having an adjustable contact, means for connecting said bridging circuit across a predetermined number of said main resistances, means for stepping said bridging circuit to different positions on said main series of resistances, independent control means for actuating said adjustable slide wire contact, means controlled by said slide wire contact as it approaches either limit of its travel for actuating said stepping means, a control having at least two numerical position indicators, means for moving one of said indicators in direct relation with said slide wire contact, and means for moving the other of said indicators in direct relation with said stepping means.

12. In a computing scale having a weighing mechanism and means for producing a current flow proportional to weight, the combination of means for producing a substantially constant current flow, a potentiometer for receiving said constant current flow and developing a corresponding voltage, said potentiometer including a main series of resistances, a bridging circuit including a slide wire resistance having an adjustable contact, means for connecting said bridging circuit across a predetermined number of said main resistances, means for stepping said bridging circuit to different positions on said main series of resistances, independent control means for actuating said adjustable slide wire contact, means controlled by said slide wire contact as it approaches either limit of its travel for actuating said stepping means, a control having at least two numerical position devices, means for moving one of said devices in direct relation with said slide wire contact, means for moving the other of said devices in direct relation with said stepping means, and differential means operable between said devices for transferring the movement of said one device to said other device to move said other device independently of the movement of said stepping means.

13. In a computing scale having a weighing mechanism and means for producing a current flow proportional to weight, the combination of means for producing a substantially constant current flow, a potentiometer for receiving said constant current flow and developing a corresponding voltage above ground, said potentiometer including a series of resistances, a bridging circuit including a slide wire resistance having an adjustable contact, means for connecting said bridging circuit across a predetermined number of said main resistances, a ground connection to one of said main series of resistances at least one step in advance of the end of said series, and means for stepping said bridging circuit to different positions on said main series including said step beyond said ground connection to establish a point on said slide wire corresponding to ground or zero value.

14. In a computing scale having a weighing mechanism and means for producing a current flow proportional to weight, the combination of means for producing a substantially constant current flow, a potentiometer for receiving said constant current flow and developing a corresponding voltage above ground, said potentiometer including a main series of resistances, a bridging circuit including a slide wire resistance having an adjustable contact, means for connecting said bridging circuit across a predetermined number of said main resistances, a ground conection to one of said main series of resistances at least one step in advance of the end of said series, means for stepping said bridging circuit to different positions on said main series including said step beyond said ground connection to establish a point on said slide wire corresponding to ground or zero value, and means operable in said end position of said bridging circuit for adjusting the resistances to maintain a uniform resistance to ground in the circuit of said current flow and a uniform resistance in all stepping positions of said bridging circuit.

(References on following page)

References Cited in the file of this patent

UNITED STATES PATENTS

| | | |
|---|---|---|
| 1,515,995 | Bryce | Nov. 18, 1924 |
| 1,893,009 | Ward | Jan. 3, 1933 |
| 2,277,365 | Michael | Mar. 24, 1942 |
| 2,443,098 | Dean | June 8, 1948 |
| 2,449,072 | Houghton | Sept. 14, 1948 |
| 2,454,520 | Moore | Nov. 23, 1948 |
| 2,478,720 | Sourwine et al. | Aug. 9, 1949 |
| 2,497,961 | Shaw | Feb. 21, 1950 |
| 2,508,424 | Rouy | May 23, 1950 |
| 2,537,498 | Wickesser | Jan. 9, 1951 |
| 2,545,655 | Doyle et al. | Mar. 20, 1951 |
| 2,581,205 | Reilly | Jan. 1, 1952 |
| 2,584,897 | Marco | Feb. 5, 1952 |
| 2,713,457 | Bubb | July 19, 1955 |

FOREIGN PATENTS

| | | |
|---|---|---|
| 325,168 | Great Britain | Feb. 13, 1930 |